United States Patent [19]

Kramer

[11] Patent Number: 4,610,500

[45] Date of Patent: Sep. 9, 1986

[54] HOLOGON LASER SCANNER APPARATUS

[75] Inventor: Charles J. Kramer, Pittsford, N.Y.

[73] Assignee: Holotek Ltd., Rochester, N.Y.

[21] Appl. No.: 641,536

[22] Filed: Aug. 16, 1984

[51] Int. Cl.$^4$ .............................................. G02B 26/10
[52] U.S. Cl. ..................................... 350/3.71; 350/6.7
[58] Field of Search ......................... 350/3.71, 6.2, 6.7, 350/6.9

[56] References Cited

U.S. PATENT DOCUMENTS

| | | | |
|---|---|---|---|
| 4,289,371 | 9/1981 | Kramer | 350/3.71 |
| 4,415,224 | 11/1983 | Dickson | 350/3.71 |
| 4,428,643 | 1/1984 | Kay | 350/3.71 |
| 4,505,537 | 3/1985 | Funato | 350/3.71 |

Primary Examiner—John K. Corbin
Assistant Examiner—B. S. Shapiro
Attorney, Agent, or Firm—Martin LuKacher

[57] ABSTRACT

A unitary assembly of a hologon scanner disc or spinner, a motor for rotating the disc and a lens for focusing the deflected laser beam on an image surface. A housing including a base plate and a cover removably mounted on the base plate, encloses the hologon disc. The base plate has a surface with respect to which the position of the hologon disc and lens is referenced. The cover has a platform on which lenses are interchangably mounted, such that, each lens has the correct position and orientation with respect to the entrance pupil of the scanner system. The hologon disc is also removably mounted on the shaft of the motor and referenced against a shoulder of the shaft which is precisely spaced with respect to the reference surface of the base plate of the housing. The hologon deflector facets of different discs which are mounted on the shaft always have the same alignment with respect to the lens and the laser beam which is incident thereon. The unitary assembly may be installed in a laser printer, or other device requiring a scanner, aligned with the beam of the laser which enters an opening in the housing below the hologon disc. The beam is deflected and scanned by the disc grating facets and focused by the lens on the imaging surface, such as the drum or belt on which a latent electrostatic image is formed by the scanned laser beam.

9 Claims, 3 Drawing Figures

HOLOGON LASER SCANNER APPARATUS

DESCRIPTION

The present invention relates to laser scanner apparatus using a hologon (diffraction grating based deflector), and particularly to a hologon scanner with the hologon deflector, motor and optics aligned with each other in a unitary assembly which enables the use of interchangeable optics and interchangeable hologon deflectors.

The invention is especially suitable for use in laser printing, photo typesetting, optical displays, noncontact measurements (e.g., scanning machine parts in meterological applications), code symbol (e.g., bar code) readers, and in other applications where precise scanning of a laser beam is needed.

Heretofore laser scanners have been designed for specific applications. The deflector, scanner drive motor, optics for focusing and error compensation, and the support structure that provided alignment between these components were designed uniquely for the application. Thus each model of laser printer or other device using a scanning system was unique to that device and could not be easily used elsewhere. Since different devices have different requirements which may be predicated upon the wavelength of the laser light which is used, the imaging surface characteristics, scan length, scan resolution and the space available for the scanner apparatus, providing a scanner apparatus as a unitary component, while desirable, has not been accomplished. The problem is exacerbated not only because different optics and different hologons are required, but also because the alignments (angular relationships and spacings) of the hologon and optics are critical and must be maintained to achieve precision scanning, without resolution degradation and scanning errors.

It is the principal feature of the present invention to provide hologon scanner apparatus as a unitary component, fully assembled with the hologon, its drive motor and optics (focusing lens) which will meet requirements, such as laser wavelength, resolution, scan angle and linearity peculiar to the device in which the scanner is used; the optics and hologon being interchangeable and maintaining the requisite alignments for precision scanning when interchanged. Lenses optimal for different scanning applications and laser wavelengths and hologons optimal for different laser wavelengths, scan lengths and efficiencies may be used in the unitary scanner apparatus which is provided in accordance with the invention.

It is a principal object of the invention to provide hologon scanner apparatus fully assembled as a unitary component in a housing complete with drive motor and optics and which is suitable for direct incorporation into a device such as a laser printer, which requires a scanner.

Briefly described, scanner apparatus embodying the invention uses a hologon disc, a motor for rotating the disc and a lens for focusing a laser beam diffracted by the hologon to an image surface. A housing assembles the lens, hologon and motor as a unitary component. The housing has a base and a cap which is removably mounted on the base. The motor is attached to the base and has a shaft extending into the housing. The hologon disc is mounted on the shaft within the housing and spaced from the base. The cap has a platform on which the lens is removably mounted. The alignments and spacings are maintained since the shaft, the cap and the platform reference the lens and the hologon to a reference surface of the base of the housing.

The foregoing and other objects features and advantages of the invention, as well as a presently preferred embodiment thereof, will become more apparent from a reading of the following description in connection with the accompanying drawings in which.

Figure 1:
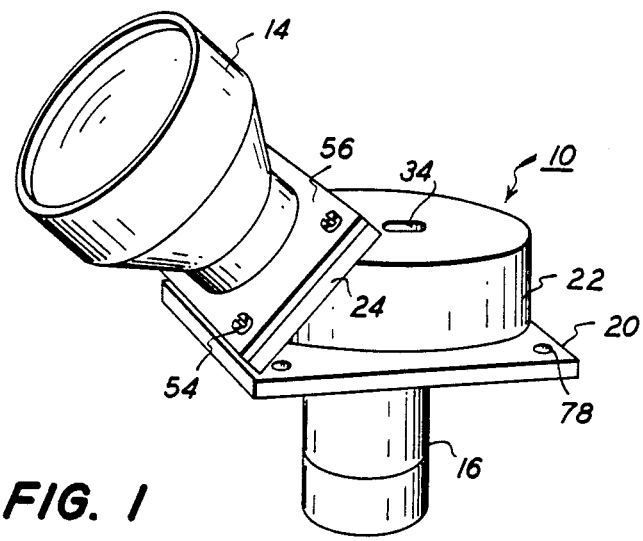
FIG. 1 is a perspective view of a hologon scanner with its components integrated in a unitary assembly adapted to be installed in a device, such as a laser printer, which requires a scanner.
Figure 3:
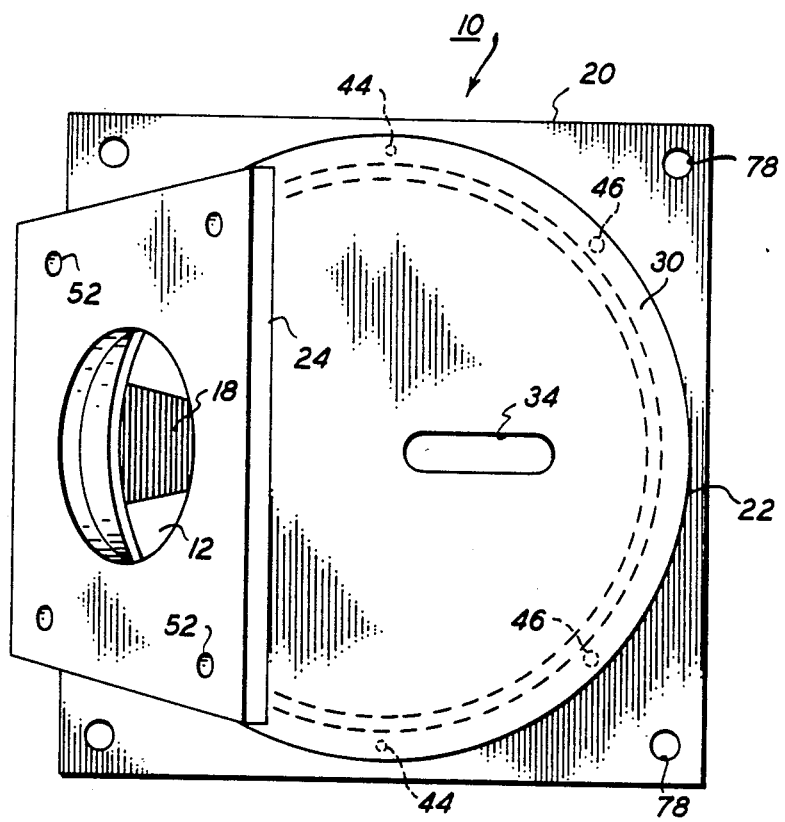
FIG. 3 is a plan view of the scanner shown in FIG. 2 with the interchangeable lens and its mounting flange removed.
Figure 2:
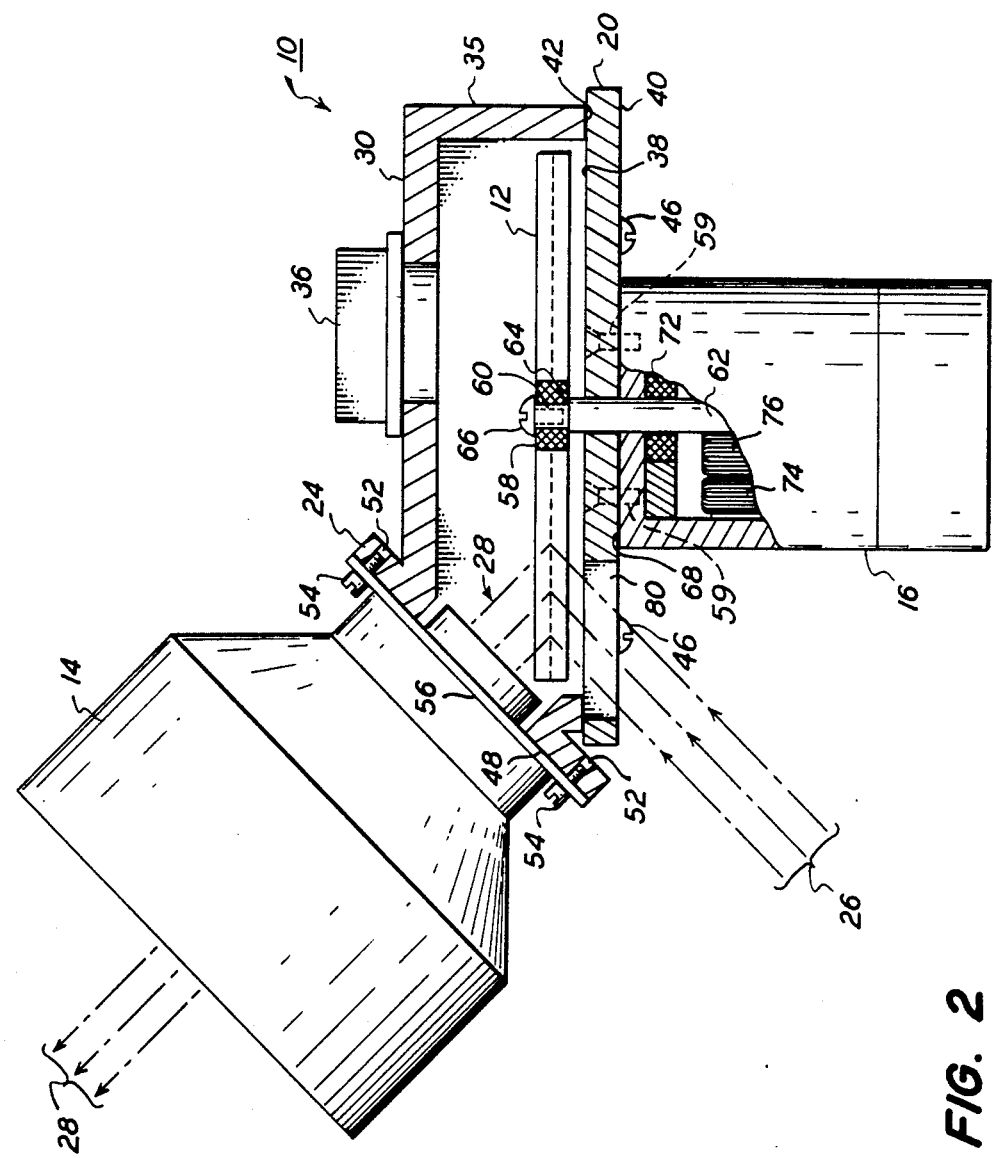
FIG. 2 is an elevational view, partially in section, of the scanner shown in FIG. 1.

Referring more particularly to the drawings, the scanner apparatus has as its principal components, a housing or enclosure 10, a hologon disc 12, a lens 14 and a motor 16. The hologon disc has a plurality of deflection grating facets 18. Such hologon deflector discs are described, and their fabrication discussed, in the following article: Charles J. Kramer, Hologon Laser Scanners For Nonimpact Printing, Proceedings of SPIE Vol. 390, p. 165 (1983), and the references cited therein. It will be noted that the facets are sandwiched between two discs of glass. The facets may be formed on one disc and the second disc air spaced from the first. The use of the sandwiched arrangement is preferable since the holographic deflector facets are protected.

The housing 10 has a base plate 20 and a cap or cover 22. The cover has a lens mounting platform 24 disposed at an angle, such as 45 degrees, which is the angle which the diffracted laser beam makes with the plane of the holographic gratings. The incident beam, 26, is diffracted, at the hologon; leaving as the scan beam 28. The platform 24 and the other parts of the cover or cap 10 are preferably an integral piece which may be a machined casting of metal, such as aluminum. The platform 24 may be a separate plate which is aligned, as by alignment pins extending from the platform into holes in the cover 10, and cemented to the cover 10, as by epoxy cement. The top 30 of the cover 10 may be separate from the cylindrical side wall 35 thereof and also cemented together with the side wall.

An opening 34 provides for the passage of light from an optical rotation sensor which detects the passage of the facets and may be used to provide a control signal for controlling the motor speed. This rotation sensor 36 is shown mounted on the top 30 of the cover 10. It may contain a source of light, such as a light emitting diode (LED) and a photo detector which detects light from the LED reflected from the edges of the facets or lines on the hologon disc surface and provides pulses corresponding to the speed of rotation of the facets (i.e., the speed of rotation of the hologon disc 12).

The base plate 20 has accurately machined, and planar top and bottom surfaces 38 and 40. The upper surface 38 provides a reference surface with respect to which all of the elements of the scanner are referenced. The alignments are maintained with respect to the reference surface 38, even when the lens 14 is interchanged and even when the hologon 12 is interchanged. The bottom surface 40 of the plate 20 is coplanar with the top surface 38 and spaced from the top surface 38 by the thickness of the plate 20. The end 42 of the side wall 35 of the cover is machined flat and has pins 44 which enter into holes in the base plate 20. The cover is secured by bolts which screw into tapped holes 46 in the side walls 35 of the cover 10. The surface 48 of the plate 24 defines the platform for the lens 14. Holes 52 in the platform plate 24 are tapped, and receive the threaded ends of bolts 54 which extend through holes in a flange 56 of the lens 14 which extends from the lens barrel. The lenses are interchangeable by removing the bolts 54.

Each lens is designed so that its entrance pupil is in the facet 18 of the hologon disc 12 which diffracts the incident laser beam 26 and provides the scan beam 28. Since the surface 48 is machined flat and is precisely spaced from the hologon the entrance pupil distance is maintained in all of the interchangeable lenses 14 which are mounted on the lens mounting platform 24 of the cover 10.

The spacing of the hologon disc from the reference surface 38 is obtained by providing the hologon with a hub 58 which fits onto a reduced diameter end 60 of the shaft 62 of the motor 16. The end 60 of the shaft 62 defines a shoulder 64 which bears against the lower surface of the hologon hub 58. At the end 60 of the shaft 62 is a tapped hole which receives a hold down fastener, such as a screw 66. The screw clamps the hub 58, and therefore the hologon 12, against the shoulder 64. The shoulder is precisely spaced from the reference surface 38 by mounting the upper end surface 68 of the motor housing to the bottom surface 40 of the base plate, for example with screws 59. The motor housing contains bearings 72 which precisely locate the shaft 62 along the axis of the motor with respect to its top surface. The shaft also contains the stator 74 and rotor 76 windings of the motor. The motor housing is secured to the base plate by bolts which extend through the base plate 20 into tapped holes in the top of the motor housing. Other means of attachment which maintain the precise spacings and alignments may be used.

The scanner may be incorporated by mounting it in the device (e.g. the laser printer) in which it is used by bolts which extend through holes 78 in the corners of the base plate 20. It is only required that the base plate be installed at the proper angle with respect to the incident laser beam so that the beam can pass through the opening 80 in the base plate 20 and be incident upon the hologon. The surface on which the scan bean is imaged (the image plane) is defined by the lens 14 and the imaging device (e.g. the photo receptor surface which is located in the image plane). A unitary component has therefore been provided which serves the scanning function. The lenses which are used with the scanner are interchangeable. The hologon discs are also interchangeable. Accordingly, the scanner can be specified with different lenses and hologons so as to meet the scanning system requirements of a large variety of printers and other devices which require a scanner.

The unitary assembly has been illustrated with a hologon function in the transmission mode. This assembly is suitable for hologon operating in the reflection mode as well. In the reflection mode, the focusing lens would be used in the double-pass arrangement, that is, the focusing lens both collimates the incident beam and images the scan beam, as shown in FIG. 7 of "Holographic Laser Scanners For Nonimpact Printing," by Charles Kramer, Laser Focus, June 1981.

Variations and modifications in the herein described apparatus, within the scope of the invention, will undoubtedly suggest themselves to those skilled in the art. Accordingly, the foregoing description should be taken as illustrative and not in a limiting sense.

I claim:

1. Scanner apparatus comprising a hologon disc, a motor for rotating said disc, and a lens for focusing a laser beam diffracted by said hologon disc to an image surface, a housing unitarily assembling said hologon disc, lens and motor with each other, said housing having a base and a cap removably mounted on said base, said motor being attached to said base and having a shaft extended into said housing, said hologon disc being mounted on said shaft within said housing and spaced from said base, said cap having said lens removably mounted on said cap such that the axis of said lens is at a predetermined angle to said base, said base being a plate, said cap being a cover having a top and side wall, and the end of said side wall being referenced against the surface of said plate which faces said cover.

2. The apparatus according to claim 1 wherein said cover encloses said hologon disc, said base plate having an opening through which said laser beam passes to be incident upon said hologon disc and said top wall of said cover having an opening for passage of light to an optical sensor for detecting the rotation of said hologon disc.

3. The apparatus according to claim 1 wherein said cover has a platform section with a surface disposed such that a normal to said surface makes said predetermined angle with said base plate, said lens being removably mounted on said platform.

4. The apparatus according to claim 3 wherein said lens has a lens barrel and a flange with a surface perpendicular to the axis of said barrel, said flange being removably mounted on said platform with said flange surface against said platform surface.

5. The apparatus according to claim 4 wherein said base plate has an opening through which said incident laser beam passes into said housing.

6. The apparatus according to claim 4 wherein said laser beam passes into said housing to be incident upon said hologon disc where it is diffracted, said disc defines an entrance pupil from which said diffracted beam exits, said platform surface defining a fixed reference spacing between said entrance pupil and said lens.

7. The apparatus according to claim 6 wherein said shaft has a shoulder disposed at a fixed distance from said surface of said base plate, said shaft extending through said hologon disc with said shoulder against a surface of said hologon disc referencing said hologon disc and said entrance pupil thereof to said surface of said base plate.

8. The apparatus according to claim 7 further comprising a fastener removably disposed on an end of said shaft and bearing against the surface of said hologon disc opposite to said shoulder for clamping said hologon disc on said shaft.

9. The apparatus according to claim 7 wherein said motor has a housing having a mounting surface with a preset spacing from said shoulder, said base plate having an outside surface opposite to said surface thereof which faces said cap and defines an inside surface of said housing, said outside surface being parallel to and spaced from said inside surface by the thickness of said base plate, and said motor housing being attached to said base plate with its said mounting surface against the outside surface of said base plate.

* * * * *